United States Patent Office 3,428,299
Patented Feb. 18, 1969

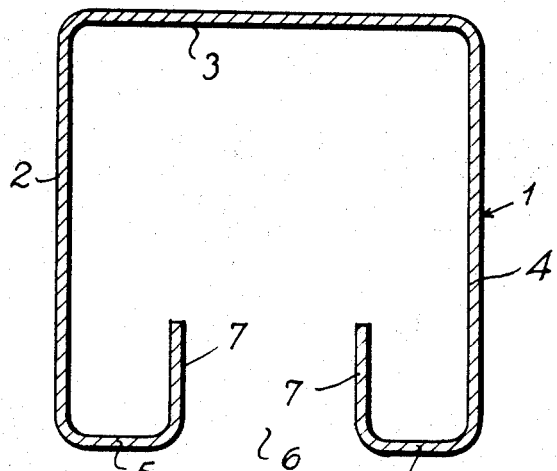
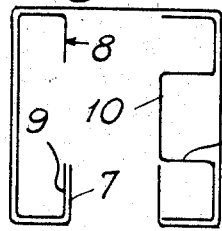
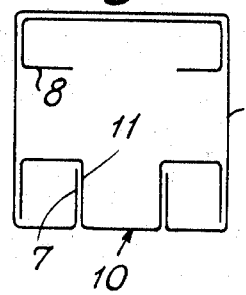
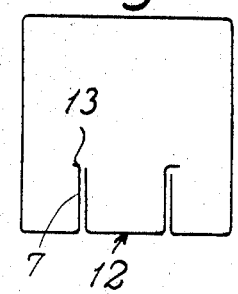
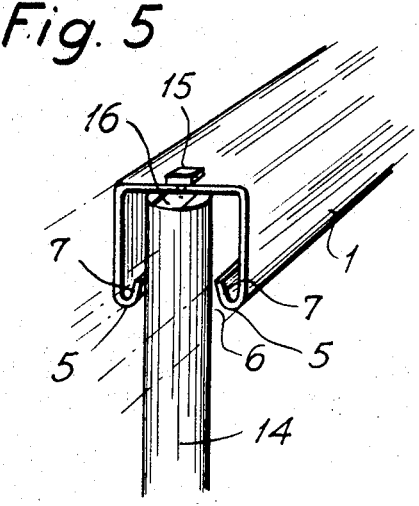
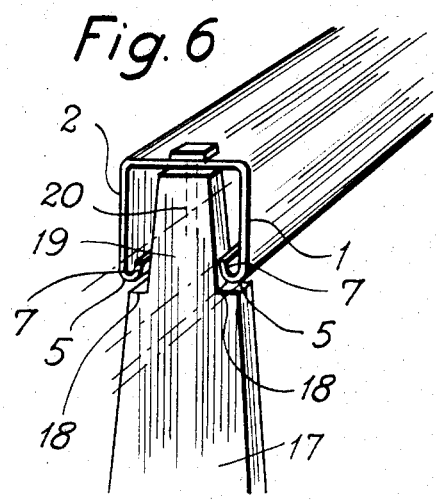

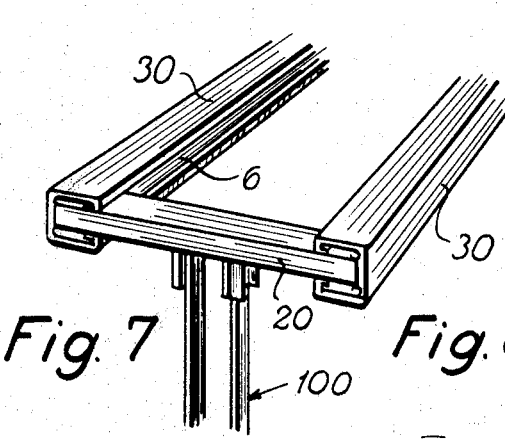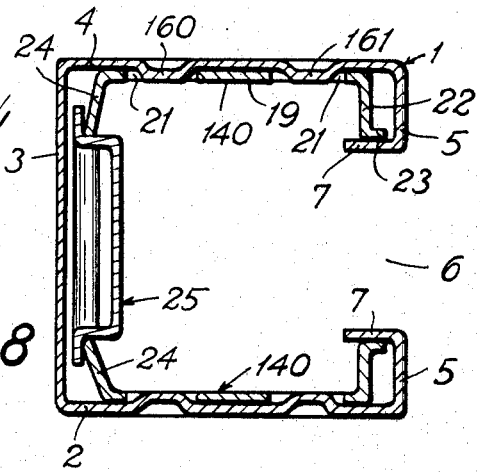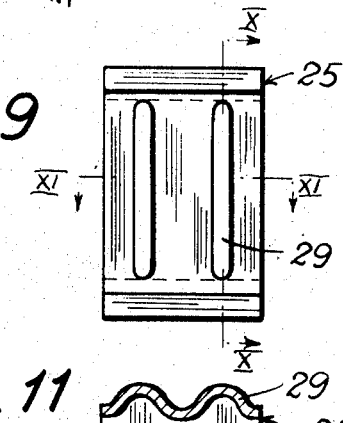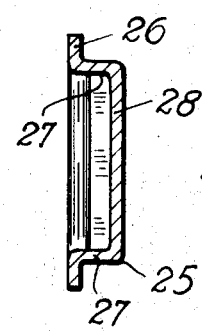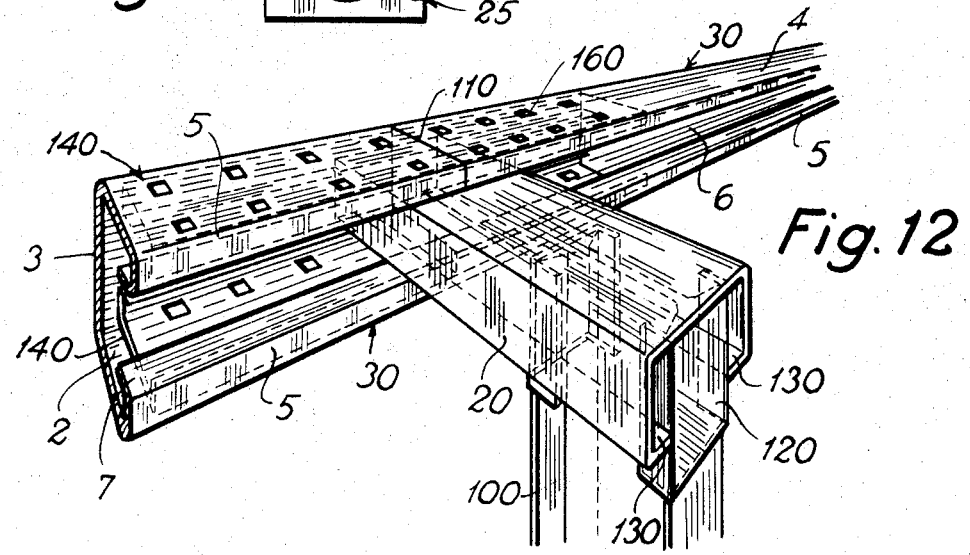

3,428,299
GIRDER, MORE PARTICULARLY FOR A MOTORWAY SAFETY FENCE
Ralph Mogens Mogensen, 4 Niles Brocksgade, Copenhagen, Denmark
Filed Apr. 9, 1965, Ser. No. 446,906
Claims priority, application Denmark, Apr. 9, 1964, 1,769/64; Nov. 10, 1964, 5,544/64
U.S. Cl. 256—13.1      11 Claims
Int. Cl. E01f *13/00;* E04c *3/32*

ABSTRACT OF THE DISCLOSURE

A motorway safety fence made of a horizontal guard rail mounted on upright supports. The guard rail is a multi-sectioned girder. Each of the girder sections is a plate profile having a rectangular cross-section, a longitudinal slot being provided in one of its sides, and along the edges of the slot inwardly extending flanges being provided. The upper ends of the upright supports extend through the slot.

---

The invention relates to a girder consisting of cold-rolled steel plate, more particularly for a motorway safety fence. Cold-rolled girders of box-shape section possess several advantages, among other things the section has a large moment of inertia in relation to the consumption of material, and the girder may have a nice, smooth surface, just as assembly means for assembling girders mounted in extension of each other and the girder itself and other members may conveniently be provided.

Wholly closed box-shaped sections are made by cold-rolling steel plate, and after the rolling it is necessary to perform a welding operation which increases the cost of manufacture and spoils one of the surfaces of the girder.

It is the object of the present invention to provide a girder which can be made by cold-rolling of steel plate and has the said advantages, but not the said drawbacks, and which is very suitable for use as longitudinal girders in a safety fence for motorways.

The invention thus relates to a girder made of cold-rolled steel plate of square or rectangular cross section, a central opening provided in one side of the girder forming a longitudinal slit along the edges of which flanges project into the cavity of the section, the said flanges being substantially parallel with the two opposing unbroken sides.

In such an embodiment the section has substantially the same calculating constants as a closed box-shaped section, and the girder may be produced by a single cold-rolling operation without welding, whereby all the surfaces may become perfectly smooth.

The slit provided in one side gives easy access to the central cavity, whereby coupling to other parts is facilitated, and effective rust prevention and maintenance are rendered possible, because there is easy access to the interior of the girder. It is also easy to place pipings or cables in the cavity of the section, also after the structure into which the girder is incorporated having been completed.

Such open girders may readily be assembled by means of specially designed butt-straps which may likewise be made by cold-rolling and cut into suitable lengths.

Girders according to the invention will in particular be suitable as structural elements that are exposed to heavy loads, and the section will thus be eminently suitable for use as a deflector beam in a motorway safety fence, since the resisting moment of the section is not reduced by a deformation to the same extent as in the case of the conventional W-sections, which usually become flat when subjected to a heavy load, whereas a section according to the invention will retain its structural height on the whole, also after the material is flowing. In that case the girder may according to the invention be mounted in such manner that the side provided with the slit is vertical and facing away from the roadway, and with horizontal supporting members projecting from outwards into the cavity of the girder, attached to the girder and to a vertical post or a similar attachment member arranged at a horizontal distance.

Such a motorway safety fence is easy to erect, since specially designed butt-straps may be provided inside the section, and the double bending constitutes an efficient means preventing the occurrence of sharp, torn or sawtooth edges which may be disastrous in case of collision and generally occur in the known closed box-shaped sections.

The inwardly bent edges provide very substantial possibilities of providing simple forms of attachment to posts or other elements by which the girder is attached to the post.

When the known sections for motorway safety fences of cold-rolled steel become twisted, they have a tendency to form a ramp which assists a vehicle in running over the safety fence. A section according to the invention has no such tendency and it will always retain a comparatively compact form, even when twisted.

It is known to assemble girders by overlapping or by means of butt-straps, the girders being retained by means of rows of bolts or rivets. In many cases, however, particularly in motorway safety fences with a number of girders mounted in extension of each other and supported by posts it will be advantageous if bolts, rivets or similar assembly means may be dispensed with since this will simplify both construction and mounting and allow of easy replacement of damaged girders.

In one embodiment according to the invention there is provided a girder with two oblong butt-straps at each joint inside the box-shaped section, the said butt-straps resting in contact with two parallel side walls, the butt-straps and the surfaces they are resting in contact with being provided with projections and depressions engaging each other, in addition to which there are distance members adapted to establish resilient engagement with the butt-straps and to keep these at such distance from each other that the projections and the depressions remain in engagement.

In such a design the girders may be joined by snap action and readily disassembled, and once joined they will provide a fixed, rigid and safe connection rendering displacement and turning in relation to each other impossible.

The invention is also concerned with various suitable embodiments of such snap action joints which will be further described in the following.

Various embodiments of a girder according to the invention will now be described with reference to the drawing, in which FIGURE 1 shows a section through the girder,
FIGURE 2 is the same on a reduced scale with two embodiments of butt-straps,
FIGURE 3 is the same as shown in FIGURE 2 in a modified embodiment,
FIGURE 4 shows the same as FIGURE 1 on a reduced scale, with a closing member,
FIGURE 5 shows a girder according to the invention, used as a motorway safety fence and mounted on a post,
FIGURE 6 is the same as FIGURE 5, showing a modified embodiment,
FIGURE 7 shows the girder section according to the invention, used for a double safety fence, viewed in perspective, FIGURE 8 is a section through a girder with butt-straps and distance members, FIGURE 9 is a front view of a distance member, FIGURE 10 is a section taken on the line X—X of FIGURE 9, FIGURE 11 is a section taken on the line XI—XI of FIGURE 9, and FIGURE 12 represents an assembly of two girders for a motorway safety fence, mounted on a transverse beam, viewed in perspective.

FIGURE 1 shows a section through a girder which, as a whole, is denoted by 1 and is of square shape, having three unbroken sides 2–4 at right angles to each other and a fourth side 5 having an opening 6 which constitutes a longitudinal slit in the girder and along the edges of which there are flanges 7 projecting into the interior of the section, the said flanges being of such size and so arranged that the section is substantially of the same moment of inertia about both main axes as a closed box-shaped section of the same dimensions. With the provision of suitable transverse members the twisting moment may be as in a closed box-shaped section and the resistance to compression in a direction parallel with the flanges 7 will be great.

A girder as shown in FIGURE 1 may be manufactured by cold-rolling of a steel plate or, if desired, of another metal in one operation and may easily be protected against rust inside since the slit or slot 6 gives access for apparatus used for such purposes.

FIGURE 2 shows a girder section 1 in which there is mounted a butt-strap 8 of C-shaped cross section so that it may be inserted as indicated in one side of the girder with one of its flanges 9 lying adjacent to the flange 7. The same figure illustrates another embodiment of a butt-strap 10, also shown in FIGURE 3, mounted in a different manner in the section because it serves to close the slit 6, that is, the butt-strap is furthermore acting as a cover plate.

The butt-strap and cover plate 10 is of U-shaped cross section with a bottom width corresponding to the width of the section 1, and at the middle of the bottom is a bent part 11 of such form that it fills out the space between the flanges 7 as indicated in FIGURE 3. The said figure also indicates how the butt-strap 8 may be mounted in a manner different from that shown in FIGURE 2.

FIGURE 4 shows another embodiment of a cover plate denoted 12 and fitting in the space between the flanges 7 with its bent webs 13.

FIGURE 5 shows a girder according to FIGURES 1–4 used as a girder in a motorway safety fence supported by vertical posts which are embedded in the ground and project through the slit 6 provided in the girder and attached to same by means of bolts 15 screwed into a threaded member 16 on top of the supporting post.

FIGURE 6 shows a motorway safety fence corresponding to that indicated in FIGURE 5, but in this case use is made of a flat post 17 with horizontal shoulders 18 which form the transition to a neck 19 received in the cavity of the girder. The girder is attached to the neck 19 by means of a bolt 20. In the designs according to FIGURES 5 and 6 the flanges 7 are resting in contact with a surface of the post so that the girder is supported by the post.

FIGURE 7 shows a motorway safety fence in which two girders 30 of the said section are supported by a transverse beam 20 which is resting on a pillar or post 100. As will be seen from the said figure, the beam 20 extends through the slit 6 into the cavity of the girder sections. Such a motorway fence is a double safety fence which may be mounted between two parallel roadways.

FIGURE 12 shows assembly means for a single motorway safety fence of the same kind as that shown in FIGURE 7, that is, in which the girders are supported by horizontal beams 20. The safety fence is supported by posts 100 carrying the transverse beam 20 which is of U-shaped cross section with inwardly projecting flanges 130. The post 100 is of I-shaped cross section and extends into the cavity of the beam 20, being fastened by means of plates 120.

The free end of the beam 20 projects into the cavity of the horizontal deflector beams, of which two, shown in the FIGURE 2, abut to each other at 110. The girders are joined by means of butt-straps, which are denoted 140 as a whole, and are substantially of C-shaped section, their flat central parts resting in contact with the upwardly and downwardly facing sides 4 and 2 of the girders. The butt-straps are provided with openings to receive depressions 160 provided in the girders as indicated in FIGURE 8. The butt-straps have each a substantially flat part 19 resting in contact with the inner surface of the sides 2 and 4 and being provided with holes 21 to receive the projections 160. The butt-strap is in one of its sides provided with a flange 22, whose bent edge 23 is resting in contact with the upper side of the flange 7, and with another flange 24 resting in contact with a distance member 25 which is shown in FIGURES 9–11 and which keeps the two flanges 24 spaced from each other so that the butt-straps are retained in their position.

According to FIGURES 9–11 the distance member 25 has a flat part 26 adapted to rest between the side 3 and the flange 24 as indicated in FIGURE 8, in addition to two horizontal parts 27 on which the edges of the flanges 24 are treading. The connecting wall 28 of the distance member has reinforcing ribs 29.

The beams 20 are attached to the girders 30 in suitable manner, for example by means of bolts or pins, and it is evident from FIGURES 8–12 that the parts may be mounted and dismantled with comparative ease as the slit 6 provided in the section gives access to the assembly means.

What I claim and desire to secure by Letters Patent is:

1. A motorway safety fence consisting of a horizontal guard girder constituted of a plurality of coaxially arranged sections, detachable jointing means resiliently connecting said girder sections together, and a plurality of upright support members mounted along the motorway, said support members supporting said girder sections, each of said girder sections being a plate profile having a rectangular cross-section, a longitudinal slot being provided in one side of said each girder section, along the edges of the slot inwardly extending flanges being provided, the upper end of each of the upright support members extending through said slot of one of the girder sections and being connected to said one girder section.

2. A safety fence according to claim 1, in which said girder sections abut each other end to end, said detachable jointing means comprise butt-straps of C-shaped cross-section such that they lie inside the girder section in close contact with the interior surface of the girder section at a side of the girder section other than the side provided with the slot.

3. A safety fence according to claim 1, further comprising a cover plate positioned to cover portions of the slot, said cover plate being of U-shaped cross-section the bottom of which is of a width corresponding to the inside length of the slotted side of the girder section and of a height corresponding to the height of the inwardly projecting flanges of said girder section, the cover plate being provided at the middle of the bottom of the U-shaped cross-section with an upwardly projecting outwardly-bent part of a form such that it fills the space between the inwardly projecting flanges of the girder section.

4. A safety fence according to claim 3, in which the outwardly projecting part of the U-shaped cross-section of the cover plate is constituted of outwardly projecting flanges at the upper end of the cover plate.

5. A safety fence according to claim 1, in which each girder section is disposed with the slot facing downwards and with its upwardly facing side resting on the top surface of the upright supports, said upwardly facing side being provided with holes therethrough, and further comprising attachment means connected to said upright supports and extending through said holes.

6. A safety fence according to claim 1, in which each girder section is positioned so that the side provided with the slot is vertical and facing away from the roadway and further comprising transverse support members extending through the slot and being attached to said each girder section and to one of said upright supports.

7. A safety fence according to claim 1, in which said detachable jointing means comprises at each joint of said girder sections inside the profile of the girder sections two oblong butt-straps resting in contact with two parallel side walls of the girder sections, the butt-straps and the surfaces with which they are resting in contact being provided with projections and depressions engaging each other, and spacing members adapted to establish resilient engagement with the butt-straps and to keep the butt-straps at such distance from each other that the projections and the depressions remain in engagement.

8. A safety fence according to claim 6, in which said detachable jointing means comprises at each joint of said girder sections inside the profile of the girder sections two oblong butt-straps resting in contact with two parallel side walls of the girder sections, the butt-straps and the surfaces with which they are resting in contact being provided with projections and depressions engaging each other, and spacing members adapted to establish resilient engagement with the butt-straps and to keep the butt-straps at such distance from each other that the projections and the depressions remain in engagement.

9. A safety fence according to claim 7, in which each of the butt-straps is provided with flanges extending away from a flat part of the butt-strap resting in contact with said parallel side walls, one flange of each of said butt-straps resting in contact with said flanges of the girder section, and another of said flanges of said butt-strap resting in contact with one of said spacing members, said spacing members being provided at the non-slotted side of the girder sections opposite the slotted side.

10. A safety fence according to claim 9, in which the spacing members each consist of a comparatively short member the cross-section of which is constituted of a three sided rectilinear main portion and outwardly extending flanges joining the main portion at the extremities of said main portion, said flanges being perpendicular to the sides of the main portion to which they are joined, the parallel sides of the main portions of the spacing members being in resilient engagement with the edges of the flanges of the butt-straps and the outwardly extending flanges of the spacing members resting between the non-slotted side of the girder sections opposite the slotted side and the flanges of the butt-straps.

11. A safety fence according to claim 8, in which each of said spacing members consists of the end of one of said transverse supporting members of a width corresponding to the distance between the inwardly projecting flanges of the sections.

References Cited

UNITED STATES PATENTS

| | | | |
|---|---|---|---|
| 2,121,213 | 6/1938 | Small | 52—127 |
| 2,313,839 | 3/1943 | Olsen | 52—242 |
| 2,345,650 | 4/1944 | Attwood | 52—710 |
| 2,407,142 | 9/1946 | Cole et al. | 174—99 |
| 2,958,403 | 11/1960 | Robertson | 52—241 |
| 2,968,782 | 1/1961 | Herrmann et al. | 174—99 |
| 3,034,609 | 5/1962 | Young | 52—241 |
| 3,101,817 | 8/1963 | Radek | 189—36 |
| 3,137,098 | 6/1964 | Elia et al. | 52—297 |
| 3,180,457 | 4/1965 | Bohnsack | 52—241 |
| 2,655,345 | 10/1953 | Lindman | 256—22 |
| 2,773,674 | 12/1956 | Fischer et al. | 256—22 |
| 2,820,613 | 1/1958 | Schilling | 256—65 X |
| 2,907,552 | 10/1959 | Crone | 256—13.1 |
| 2,927,513 | 3/1960 | Dove | 256—13.1 X |
| 3,028,148 | 4/1962 | Crannell | 256—13.1 |
| 3,114,303 | 12/1963 | Oberbach | 256—13.1 X |
| 3,195,864 | 7/1965 | Case | 256—65 |
| 3,195,937 | 7/1965 | Case | 256—65 X |

DAVID J. WILLIAMOWSKY, *Primary Examiner.*

DENNIS L. TAYLOR, *Assistant Examiner.*

U.S. Cl. X.R.

52—726